US006144122A

United States Patent [19]

Covell et al.

[11] Patent Number: 6,144,122

[45] Date of Patent: Nov. 7, 2000

[54] POWER TOOL WITH SWITCH AND ELECTRICAL CONNECTOR ASSEMBLIES

[75] Inventors: Kevin W. Covell, Freeland; Michael R. Sell, Belair, both of Md.

[73] Assignee: Black & Decker Inc., Newark, Del.

[21] Appl. No.: 09/261,026

[22] Filed: Mar. 2, 1999

[51] Int. Cl.[7] ........................... H02K 7/14; H02K 11/00; H01H 1/00; H01H 9/00; H01R 9/00

[52] U.S. Cl. ........................... 310/50; 200/1 V; 200/284; 310/68 R; 310/71; 439/894

[58] Field of Search .................................. 200/1 V, 292, 200/275; 361/803, 804; 174/72 B, 149 B; 310/50, 68 R, 71; 439/188, 885, 894

[56] References Cited

U.S. PATENT DOCUMENTS

| | | | |
|---|---|---|---|
| 3,437,772 | 4/1969 | Piber | 200/284 |
| 4,683,352 | 7/1987 | Yano et al. | 200/6 R |
| 4,778,964 | 10/1988 | Kamisada | 200/284 |
| 4,808,775 | 2/1989 | Satoh et al. | 200/1 V |
| 4,874,911 | 10/1989 | Parrish | 200/6 R |
| 4,947,008 | 8/1990 | Sato et al. | 200/6 R |
| 5,013,261 | 5/1991 | Seisz et al. | 439/807 |
| 5,013,266 | 5/1991 | Murphy et al. | 439/481 |
| 5,089,715 | 2/1992 | Kokubu | 307/10.1 |
| 5,533,910 | 7/1996 | Körner et al. | 439/395 |
| 5,601,183 | 2/1997 | Boyd et al. | 200/553 |
| 5,675,225 | 10/1997 | Moore et al. | 318/257 |
| 5,788,544 | 8/1998 | Drekmeier et al. | 439/885 |
| 5,814,769 | 9/1998 | Karlström et al. | 439/95 X |

FOREIGN PATENT DOCUMENTS

| | | |
|---|---|---|
| 0 373 709 | 6/1990 | European Pat. Off. . |
| 2 344 158 | 3/1974 | Germany . |
| 2 360 746 | 6/1975 | Germany . |
| 30 15 823 | 2/1981 | Germany . |
| 43 40 032 | 9/1994 | Germany . |
| 43 12 423 | 10/1994 | Germany . |
| 44 25 880 | 1/1996 | Germany . |
| 195 33 299 | 3/1997 | Germany . |
| 195 44 357 | 6/1997 | Germany . |

OTHER PUBLICATIONS

IBM Technical Disclosure Bulletin, S.C. Rieley, "Laminated Bus System", vol. 12, No. 8, Jan. 1970, pp. 1268, 1269.

*Primary Examiner*—J. R. Scott
*Attorney, Agent, or Firm*—Harness, Dickey & Pierce, P.L.C.

[57] ABSTRACT

A switch assembly has a reversible switch with an activation member, electronics, and a plurality of contacts to couple the electronics with a power source. A connector assembly is coupled with the switch assembly contacts. The connector assembly includes a first one-piece connector having a circuit portion coupled with a plurality of contacts. Also, the first connector includes a terminal portion continuous with the circuit portion and connected directly with a positive terminal of the power source. A second one-piece connector has a circuit portion coupled with a second plurality of contacts. The second connector also includes a terminal portion continuous with the circuit portion and directly coupled with a negative terminal of a power source.

25 Claims, 2 Drawing Sheets

POWER TOOL WITH SWITCH AND ELECTRICAL CONNECTOR ASSEMBLIES

BACKGROUND OF THE INVENTION

The present invention relates to power tools and, more specifically, to switch assemblies used to energize power tools.

All power tools include switch mechanisms between the power source and motor to energize the motor and, in turn, rotate or move an output. Various types of trigger, slide, toggle or the like switches are utilized in power tools. Also, some of these switches provide a reverse pathway so that the motor may be utilized in a reversing direction. Ordinarily, the switches are positioned in a housing and have various types of wire leads connected to them. The leads may include connectors or have soldered connections. Also, the switches may be coupled by a lead wire, which has both connectors and is also soldered. These connections, especially in small tools, require space as well as relatively expensive manufacturing costs. This is due to the fact that the wires and connectors require relatively large spaces. Also, they require labor extensive operations to be performed to couple the switch with the power source in the motor. Thus, it would be desirable to have an inexpensive connection between the switch, power source and motor which is compact and easily installed.

SUMMARY OF THE INVENTION

Accordingly, it is an object of the present invention to provide a connector assembly which includes an integral circuit coupled to a switch and a terminal, which couples to a power source. The present invention provides a connector assembly which is compact, easily manufactured, and reduces assembly issues. The present invention provides a connector assembly which easily directly couples with a switch and to a power source such as a battery.

In accordance with one aspect of the invention, a switch assembly comprises a reversible switch including an activation member, electronics, and a plurality of contacts coupled with the electronics. The contacts also couple the reversible switch with a power source and a motor. A first one-piece terminal circuit is formed in a desired configuration. A first portion of the first terminal circuit is coupled with a plurality of the plurality of contacts. The second portion of the first terminal circuit is directly coupled with the power source. A second one-piece terminal circuit is formed in a desired configuration. A first portion of the second terminal circuit is coupled with a second plurality of the plurality of contacts. The second plurality of contacts being different from the first plurality of contacts and a second portion of the second terminal circuit directly coupled with a power source. The first and second terminal circuits are stamped metallic parts. The first portion of the terminal circuits is substantially planar with two apertures to receive two contacts from the plurality of contacts on the switch. A second portion of the first terminal circuit is continuous and extends substantially coplanar with the first portion of the terminal circuit. Also, a member is formed at the end of the second portion to couple with the power source. The second terminal circuit second portion is continuous and extends substantially perpendicular from the first portion and includes a projection member to couple with the power source. The first portion of the first and second terminal circuits are positioned on top of one another and are separated by an insulation member.

In accordance with a second aspect of the invention, a switch assembly comprises a reversible switch which includes an activation member, electronics and a plurality of contacts coupled with the electronics. Also, the contacts are adapted to couple the reversible switch with the power source and a motor. A pair of formed rigid terminal circuits have a desired configuration. Each terminal circuit has a first portion to couple with a plurality of contacts. Each first portion is coupled with a different plurality of contacts. Each of the terminal circuits has a second portion to directly couple with a power source. Both terminal circuits are stamped metallic parts. The first portions of the pair are substantially planar and include a pair of apertures to receive the plurality of contacts. The second portion of the first terminal circuit is continuous with and substantially coplanar with the first portion. A terminal end is coupled with the second portion to couple the terminal with the power source. The second terminal circuit has a second portion which is continuous and substantially perpendicular to the first portion. Also, it includes a projection member in contact with the power source. Further, an insulation member is sandwiched between the first portions of the terminal circuits.

In accordance with a third aspect of the invention, a power tool comprises a housing, a motor in the housing, an output coupled with the motor, a power source coupled with the motor, and a switch assembly coupled with the power source and the motor. The switch assembly enables energizing of the motor to drive the output. The switch assembly comprises a reversible switch which includes an activation member, electronics and a plurality of contacts coupled with the electronics. Also, the contacts are adapted to couple the reversible switch with the power source and a motor. A pair of formed rigid terminal circuits have a desired configuration. Each terminal circuit has a first portion to couple with a plurality of contacts. Each first portion is coupled with a different plurality of contacts. Each of the terminal circuits has a second portion to directly couple with a power source. Both terminal circuits are stamped metallic parts. The first portions of the pair are substantially planar and include a pair of apertures to receive the plurality of contacts. The second portion of the first terminal circuit is continuous with and substantially coplanar with the first portion. A terminal end is coupled with the second portion to couple the terminal with the power source. The second terminal circuit has a second portion which is continuous and substantially perpendicular to the first portion. Also, it includes a projection member in contact with the power source. Further, an insulation member is sandwiched between the first portions of the terminal surface.

In accordance with a fourth aspect of the invention, a connector assembly comprises a first one-piece connector having a circuit portion adapted to be coupled with a plurality of contacts. A terminal portion is continuous with the circuit portion and is adapted to be directly coupled with a positive terminal of the power source. A second one-piece connector has a first circuit portion adapted to be coupled with a plurality of contacts, the contacts being different from the ones which are connected to the first terminal circuit. A terminal portion is continuous with the circuit portion and is adapted to be directly coupled with a negative terminal of the power source. The connectors are stamped metallic parts. The first connector circuit portion is substantially planar with a pair of apertures to receive the plurality of contacts. The terminal portion extends coplanar with the circuit portion and includes an end adapted to couple with the positive battery terminal. The second connector circuit portion is substantially planar with a pair of apertures to receive the plurality of contacts. The terminal portion extends substantially perpendicular to the connector circuit portion and includes a projecting end adapted to couple with a negative battery terminal. An isolator is sandwiched between the first and second connector circuit portions.

From the following detailed description, description, taken in conjunction with the drawings and subjoined claims, other objects and advantages of the present invention will become apparent to those skilled in the art.

DETAILED DESCRIPTION OF THE PREFERRED EMBODIMENT

Figure 1:
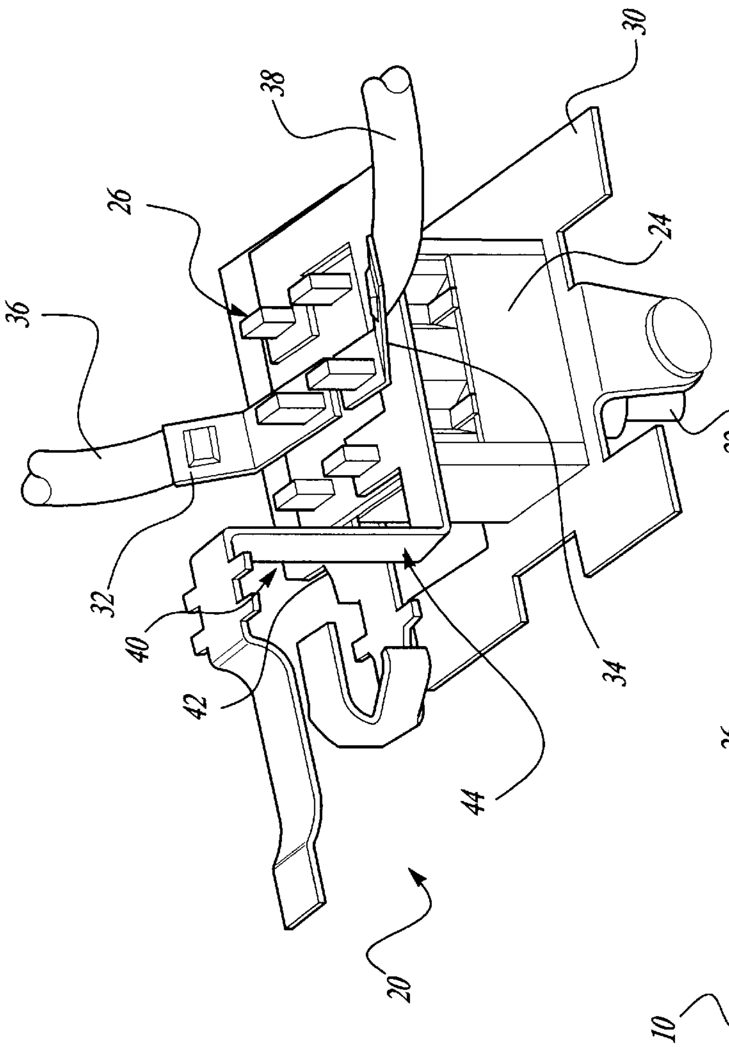
FIG. 1 is a perspective view of a connector assembly and switch in accordance with the present invention.
Figure 3:
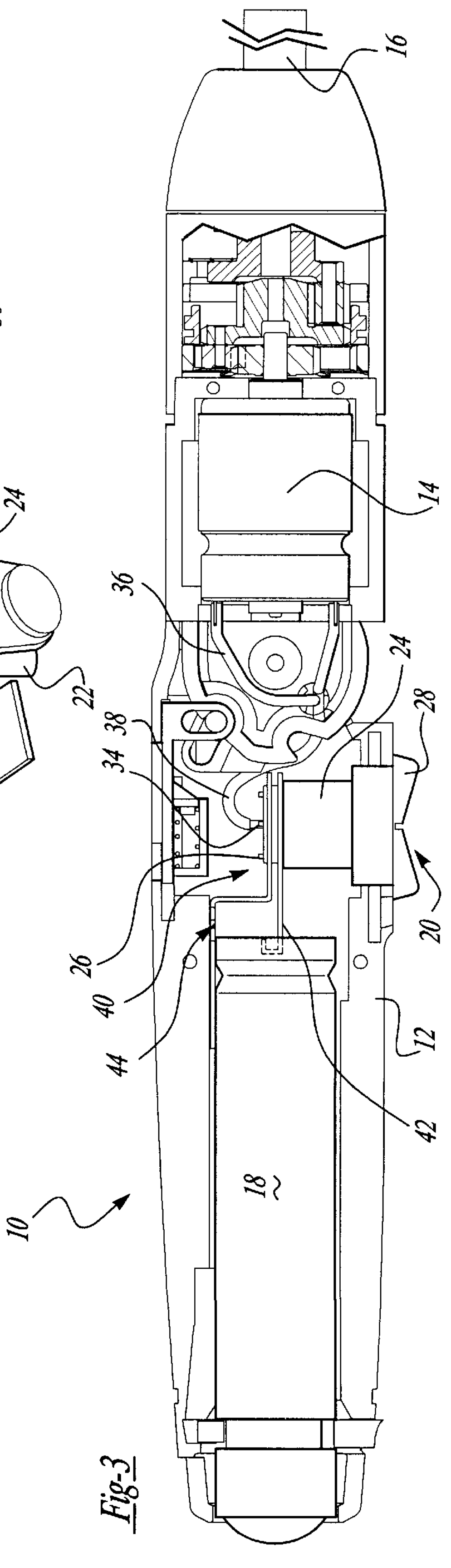
FIG. 3 is a partial section view through a power tool in accordance with the present invention.
Figure 2:
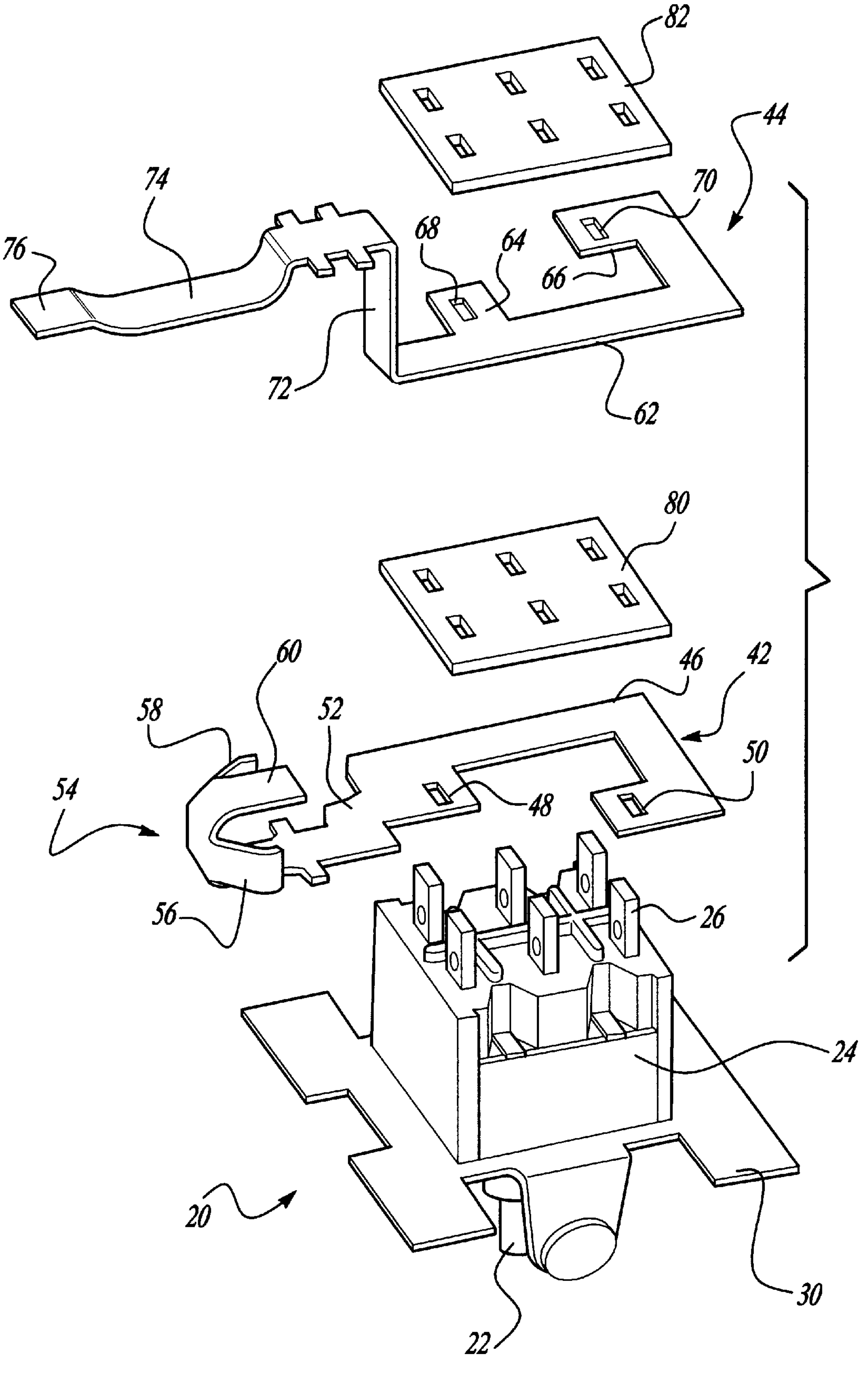
FIG. 2 is an exploded perspective view of a switch with the connector assembly in accordance with the present invention.

Turning to the figures, particularly FIG. 3, a battery operated tool is illustrated and designated with the reference numeral 10. The power tool includes a housing 12 which houses switch assembly 20. An output 16 is coupled with the motor 14. Also, a battery 18 powers the motor 14 via a switch assembly 20.

The switch assembly 20 includes an activation member 22, a body 24 which includes electronics (not shown), and contacts 26. A push button switch 28 may be coupled with the activation member 22. Also, a frame 30 surrounds the switch body to couple the switch 20 with the housing 12. Terminals 32 and 34 are coupled with the contacts 26 and include power leads 36 and 38 which lead to the motor 14.

A connector assembly 40 connects the switch 20 to the battery 18. The connector assembly 40 includes first and second terminal circuits 42 and 44. The first terminal circuit 42 includes a circuit portion 46 which has an overall L-shape and is substantially planar. Two apertures 48 and 50 enable the circuit portion 46 to couple with the contacts 26. The terminal portion 52 is continuous with the circuit portion 46 and extends substantially coplanar to the circuit portion 46. An end member 54, continuous with the terminal portion 52, has projecting members 56, 58, 60. The projecting members 56, 58, 60 couple the terminal end 54 with the positive terminal of the battery 18. The projections 56, 58, 60 extend at desired angles so that they are compressed and make sufficient contact with the positive battery terminal.

The terminal circuit 44 includes a circuit portion 62 which has an overall L-shape and is substantially planar. Projecting members 64 and 66 include apertures 68 and 70. The apertures 68 and 70 couple with contacts 26, the contacts are different from those that couple with the first terminal circuit 42. The terminal portion 72 is continuous with and extends substantially perpendicular to the planar first circuit portion 62. The terminal portion 72 includes an extending portion 74 with an end 76. The portion 74 has a desired, preferably arcuate, configuration so that it projects to contact the negative terminal of the battery 18. Thus, the circuit portions directly couple with the switch contacts 26. Likewise, the terminal portions contact directly with the battery 18. Accordingly, this provides a compact switch assembly which eliminates the need for costly wire leads and wire connectors. Also, the present assembly enables easy manufacturing, enabling the circuit portion to be coupled with the contacts and soldered.

Insulation members 80 and 82 are sandwiched with respect to the first and second terminal contacts 42 and 44. The insulation member 80 is positioned between the two circuit portions 46 and 62. The second insulation member 82 is positioned on top of the second terminal circuit 44. The insulation isolators provide electrical insulation so that the contacts do not touch one another.

While the above detailed description describes the preferred embodiment of the present invention, the invention is susceptible to modification, variation, and alteration without deviating from the scope and fair meaning of the subjoined claims.

What is claimed is:

1. A switch assembly comprising:

a reversible switch including an activation member, electronics, and a plurality of contacts coupled with said electronics and for coupling the reversible switch with a power source;

a first one-piece terminal circuit formed in a desired configuration, a first portion of said first terminal circuit coupling with a plurality of said plurality of contacts, a second portion of said first terminal circuit directly coupled with the power source;

a second one-piece terminal circuit formed in a desired configuration, a first portion of said second terminal circuit coupled with a second plurality of said plurality of contacts different from said first plurality of contacts, and a second portion of said second terminal circuit directly coupled with the power source.

2. The switch assembly according to claim 1, wherein said first terminal circuit is a stamped metallic part.

3. The switch assembly according to claim 2, wherein said first portion of said first terminal circuit being substantially planar with two apertures for receiving two contacts from said plurality of contacts.

4. The switch assembly according to claim 3, wherein said second portion extends substantially coplanar from said first portion and includes a member for coupling with said power source.

5. The switch assembly according to claim 1, wherein said second terminal circuit is a stamped metallic part.

6. The switch assembly according to claim 5, wherein said first portion of said second terminal circuit is substantially planar and includes two apertures for coupling with said contacts.

7. The switch assembly according to claim 6, wherein said second portion extends substantially perpendicular from said first portion and includes projecting members for coupling with a power source.

8. The switch assembly according to claim 1, wherein said first portions of said first and second terminal circuits are positioned on top of the other separated by an insulation member.

9. A switch assembly comprising:

a reversible switch including an activation member, electronics, and a plurality of contacts coupled with said electronics and for coupling the reversible switch with a power source;

a pair of formed rigid terminal circuits having a desired configuration, each having a first portion for coupling with a plurality of said contacts, each first portion coupled with a different plurality of contacts, each having a second portion for directly coupling with the power source.

10. The switch assembly according to claim 9, wherein both terminal circuits are stamped metallic parts.

11. The switch assembly according to claim 10, wherein said first portions are substantially planar and include a pair of apertures for receiving said plurality of contacts.

12. The switch assembly according to claim 11, wherein said second portion extends substantially coplanar from said first portion and includes a member for coupling with said power source.

13. The switch assembly according to claim 11, wherein said second portion extends substantially perpendicular from said first portion and includes projecting members for coupling with a power source.

14. The switch assembly according to claim 11, wherein said first portions of said first and second terminal circuits are positioned on top of the other separated by an insulation member.

15. A power tool comprising:

a housing;

a motor in said housing;

an output coupled with said motor;

a power source coupled with said motor;

a switch assembly coupled with said power source and said motor, said switch assembly enabling energizing of said motor for driving said output;

said switch assembly comprising:

a reversible switch including an activation member, electronics, and a plurality of contacts coupled with said electronics and for coupling the reversible switch with a power source;

a pair of formed rigid terminal circuits having a desired configuration, each having a first portion to couple with a plurality of contacts, each first portion coupled with a different plurality of contacts, and each having a second portion for directly coupling with said power source.

16. The power tool according to claim 15, wherein both terminal circuits are stamped metallic parts.

17. The power tool according to claim 16, wherein said first portions are substantially planar and include a pair of apertures for receiving said plurality of contacts.

18. The power tool according to claim 17, wherein said second portion extends substantially coplanar from said first portion and includes a member for coupling with said power source.

19. The power tool according to claim 17, wherein said second portion extends substantially perpendicular from said first portion and includes projecting members for coupling with a power source.

20. The power tool according to claim 17, wherein said first portions of said first and second terminal circuits are positioned on top of the other separated by an insulation member.

21. A connector assembly comprising:

a first one-piece connector having a circuit portion to be coupled with a plurality of contacts, and a terminal portion continuous with said circuit portion, said terminal portion to be directly coupled with a positive terminal of a power source;

a second one-piece connector having a substantially planar circuit portion to be coupled with a plurality of contacts, and a terminal portion continuous with said circuit portion, said terminal portion being spaced from said circuit portion out of the plane of said circuit portion to be directly coupled with a negative terminal of the power source.

22. The connector assembly according to claim 21, wherein said first and second one piece connectors are stamped metallic parts.

23. The connector assembly according to claim 22, wherein said first connector circuit portion being substantially planar with a pair of apertures for receiving said plurality of contacts and said terminal portion extending coplanar with said circuit portion and including an end adapted to couple with a positive battery terminal.

24. The connector assembly according to claim 22, wherein said second connector circuit portion being substantially planar with a pair of apertures for receiving said plurality of contacts and said terminal portion extending substantially perpendicular to said connector circuit portion and including a projecting end adapted to be coupled with a negative battery terminal.

25. The connector assembly according to claim 21, wherein an insulator is sandwiched between said first and second connector circuit portions.

* * * * *